(12) United States Patent
Kolthammer et al.

(10) Patent No.: US 10,858,463 B2
(45) Date of Patent: Dec. 8, 2020

(54) PROCESS FOR PRODUCING PELLETIZED POLYMER COMPOSITIONS

(71) Applicant: DOW GLOBAL TECHNOLOGIES LLC, Midland, MI (US)

(72) Inventors: Brian W. Kolthammer, Lake Jackson, TX (US); Michael J. Zogg, Jr., Houston, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 615 days.

(21) Appl. No.: 15/318,141

(22) PCT Filed: Jun. 12, 2014

(86) PCT No.: PCT/US2014/042078
§ 371 (c)(1),
(2) Date: Dec. 12, 2016

(87) PCT Pub. No.: WO2015/191066
PCT Pub. Date: Dec. 17, 2015

(65) Prior Publication Data
US 2017/0129976 A1 May 11, 2017

(51) Int. Cl.
*B29B 9/06* (2006.01)
*C08F 210/16* (2006.01)
(Continued)

(52) U.S. Cl.
CPC ............... *C08F 210/16* (2013.01); *B01J 2/00* (2013.01); *B29B 9/065* (2013.01); *B29B 9/12* (2013.01)

(58) Field of Classification Search
None
See application file for complete search history.

(56) References Cited

U.S. PATENT DOCUMENTS 7,771,635 B2  8/2010  Boothe et al.
7,776,242 B2  8/2010  Sato et al.
(Continued)

FOREIGN PATENT DOCUMENTS

JP  2002316317 A  10/2002
JP  2008239752 A  10/2008
(Continued)

OTHER PUBLICATIONS

Extended European Search Report for EP Application No. 19152975.9; Report dated May 23, 2019 (9 pages).
(Continued)

*Primary Examiner* — Monica A Huson
*Assistant Examiner* — Kelsey C Grace
(74) *Attorney, Agent, or Firm* — Cantor Colburn LLP

(57) ABSTRACT

The instant invention provides an improved process for producing pelletized polymer compositions, and pelletized polymer compositions. The process for producing a pelletized polymer composition according to the present invention comprises: (1) polymerizing one or more alpha-olefins in one or more solution reactors thereby producing a molten polymer composition comprising one or more solvents; (2) removing at least a portion of said one or more solvents thereby forming a polymer composition having a low solvent content (typically less than 1,000 parts of solvent per million of polymer on a weight basis); (3) removing heat from said polymer composition having low solvent content to a temperature in the range of equal to or greater than the crystallization point of the polymer composition having low solvent content to less than or equal to a temperature in the range of from (the crystallization point of the polymer composition having low solvent content+20° C.) thereby forming a viscous polymer melt; and (4) pelletizing said (Continued)

viscous polymer melt via an underwater pelletizer thereby forming said pelletized polymer composition.

7 Claims, 1 Drawing Sheet

(51) Int. Cl.
*B01J 2/00* (2006.01)
*B29B 9/12* (2006.01)

(56) References Cited

U.S. PATENT DOCUMENTS

| | | | |
|---|---|---|---|
| 8,425,847 B2 | 4/2013 | Devoy et al. | |
| 2004/0132964 A1 | 7/2004 | Mulgrew et al. | |
| 2004/0138392 A1 | 7/2004 | Jiang et al. | |
| 2007/0235893 A1 | 10/2007 | Miyoshi | |
| 2009/0121372 A1 | 5/2009 | Campbell et al. | |
| 2012/0319318 A1* | 12/2012 | Wang | B29C 48/39 264/101 |
| 2013/0001823 A1* | 1/2013 | Ejiri | C08F 255/02 264/211 |

FOREIGN PATENT DOCUMENTS

| | | |
|---|---|---|
| JP | 2011057721 A | 3/2011 |
| JP | 2011074373 A | 4/2011 |
| JP | 2011178056 A | 9/2011 |
| WO | 2004058480 A1 | 7/2004 |
| WO | 2006101926 A2 | 9/2006 |
| WO | 2008008129 A1 | 1/2008 |
| WO | 2013052308 A1 | 4/2013 |

OTHER PUBLICATIONS

International Search Report for International Application No. PCT/US2014/042078; International Filing Date Jun. 12, 2014; dated Mar. 2, 2015, 3 pages.
Written Opinion for International Application No. PCT/US2014/042078; International Filing Date Jun. 12, 2014; dated Mar. 2, 2015, 5 pages.
Thompson at al.; "Experimerats and Flow Analysis of a Micropelletizing Die"; Poiymer Engineering and Science; vol. 44, No. 7: Jul. 2004, pp. 1391-1402.

* cited by examiner

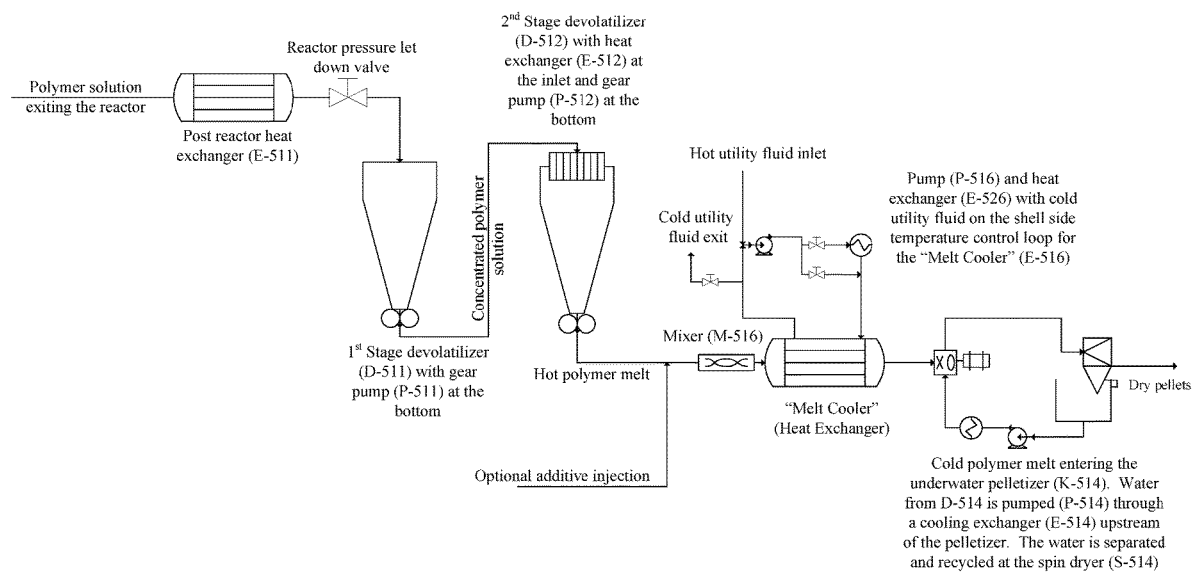

PROCESS FOR PRODUCING PELLETIZED POLYMER COMPOSITIONS

CROSS REFERENCE TO RELATED APPLICATIONS

This application is a National Stage application of PCT/US2014/042078, filed Jun. 12, 2014, which is incorporated by reference in its entirety herein.

FIELD OF INVENTION

The instant invention relates to an improved process for producing pelletized polymer compositions, and pelletized polymer compositions.

BACKGROUND OF THE INVENTION

Polymeric materials such as polyolefins, e.g. polyethylene and polypropylene, are typically formed into pellets via an underwater pelletizer. The pelletized polymer form facilitates the transportation of such polymeric materials. However, low viscosity low molecular weight polymeric materials are difficult to pelletize via conventional continuous processes without accruing additional cost.

Therefore, there is a need for an improved process for producing pelletized polymer compositions facilitating the pelletization of low viscosity low molecular weight polymeric materials via conventional continuous processes while limiting any additional cost.

SUMMARY OF THE INVENTION

The instant invention provides an improved process for producing pelletized polymer compositions, and pelletized polymer compositions.

In one embodiment, the instant invention provides a process for producing a pelletized polymer composition comprising: (1) polymerizing one or more alpha-olefins in one or more solution reactors thereby producing a molten polymer composition comprising one or more solvents; (2) removing at least a portion of said one or more solvents thereby forming a polymer composition having a low solvent content (typically less than 1,000 parts of solvent per million of polymer on a weight basis); (3) removing heat from said polymer composition having low solvent content to a temperature in the range of equal to or greater than the crystallization point of the polymer composition having low solvent content to less than or equal to a temperature in the range of from (the crystallization point of the polymer composition having low solvent content+20° C.) thereby forming a viscous polymer melt; and (4) pelletizing said viscous polymer melt via an underwater pelletizer thereby forming said pelletized polymer composition.

In an alternative embodiment, the instant invention further provides a pelletized polymer composition produced via the inventive process, wherein each pelletized polymer composition has diameter in the range of from less than 6 mm.

In an alternative embodiment, the instant invention provides a process for producing a pelletized polymer composition and a pelletized polymer composition, in accordance with any of the preceding embodiments, except that the alpha-olefin is ethylene, propylene, or combinations thereof.

In an alternative embodiment, the instant invention provides a process for producing a pelletized polymer composition and a pelletized polymer composition, in accordance with any of the preceding embodiments, except that the pelletized polymer composition has a viscosity of less than 100,000 cP at 177° C. as measured according to ASTM D1084.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 is a diagram illustrating a first embodiment of the present invention.

DETAILED DESCRIPTION OF THE INVENTION

The instant invention provides an improved process for producing pelletized polymer compositions, and pelletized polymer compositions.

The process for producing a pelletized polymer composition according to the present invention comprises: (1) polymerizing one or more alpha-olefins in one or more solution reactors thereby producing a molten polymer composition comprising one or more solvents; (2) removing at least a portion of said one or more solvents thereby forming a polymer composition having a low solvent content (typically less than 1,000 parts of solvent per million of polymer on a weight basis); (3) removing heat from said polymer composition having low solvent content to a temperature in the range of equal to or greater than the crystallization point of the polymer composition having low solvent content to less than or equal to a temperature in the range of from (the crystallization point of the polymer composition having low solvent content+20° C.) thereby forming a viscous polymer melt; and (4) pelletizing said viscous polymer melt via an underwater pelletizer thereby forming said pelletized polymer composition.

In one embodiment, the instant invention further provides a pelletized polymer composition produced via the inventive process, wherein each pelletized polymer composition has diameter in the range of from less than 6 mm.

In one embodiment the inventive process is employed to produce an ethylene based composition having a density in the range of from 0.850 to 0.910 g/cm$^3$, measured according to ASTM D792; a viscosity in the range of from less than 100,000 cP at 177° C., measured according to ASTM D1084; a weight average molecular weight ($M_w$) in the range of from 10,000 to 50,000 g/mole, and/or molecular weight distribution in the range of from 1.8 to 3.5.

In one embodiment the inventive process is employed to produce a propylene based composition having a density in the range of from 0.850 to 0.910 g/cm$^3$, measured according to ASTM D792; a viscosity in the range of from less than 100,000 cP at 177° C., measured according to ASTM D1084; a weight average molecular weight ($M_w$) in the range of from 10,000 to 50,000 g/mole, and/or molecular weight distribution in the range of from 1.8 to 3.5.

In an alternative embodiment, the instant invention provides a process for producing a pelletized polymer composition and a pelletized polymer composition, in accordance with any of the preceding embodiments, except that the alpha-olefin is ethylene, propylene, or combinations thereof.

In an alternative embodiment, the instant invention provides a process for producing a pelletized polymer composition and a pelletized polymer composition, in accordance with any of the preceding embodiments, except that each pelletized polymer composition has diameter in the range of from less than 6 mm.

In an alternative embodiment, the instant invention provides a process for producing a pelletized polymer composition and a pelletized polymer composition, in accordance with any of the preceding embodiments, except that the pelletized polymer composition has a viscosity of less than 100,000 cP at 177° C. as measured according to ASTM D1084.

The polymerization process according to the present invention is solution polymerization process using one or more conventional reactors e.g. loop reactors, isothermal reactors, plug flow reactors, and/or stirred tank reactors in parallel, series, and/or any combinations thereof in continuous or batch mode to produce olefin based polymers, e.g. ethylene polymers or propylene polymers.

Refer to FIG. 1, in general, the solution phase polymerization process occurs in one or more well-stirred reactors such as one or more loop reactors or one or more isothermal reactors at a temperature in the range of from 100 to 300° C.; for example, from 120 to 190° C., and at pressures in the range of from 300 to 1,000 psig; for example, from 400 to 750 psig. The residence time in solution phase polymerization process is typically in the range of from 2 to 30 minutes; for example, from 5 to 20 minutes. One or more α-olefins, e.g. ethylene or propylene, solvent, hydrogen, one or more catalyst systems, and optionally one or more comonomers are fed continuously to the reactor. Exemplary solvents include, but are not limited to, isoparaffins and naphthinics. For example, such solvents are commercially available under the name ISOPAR E from ExxonMobil Chemical Co., Houston, Tex. or under the name SBP 100/140 from Shell Chemicals Europe. The effluent from the polymerization reactor (containing solvent, monomer, comonomer, hydrogen, catalyst components, and molten polymer) exits the reactor and enters a zone where it is contacted with a deactivating and optionally an acid scavenging agent (typically calcium stearate and the accompanying water of hydration) to stop the reaction and scavenge hydrogen chloride. In addition, various additives such as anti-oxidants can be added at this point. The stream then goes through another set of static mixing elements such as Kenics helical static mixing elements to evenly disperse the catalyst kill and additives. The effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a multi-stage separation and devolatilization system where the polymer is removed from the solvent, hydrogen, and unreacted monomer and comonomer. Impurities are removed from the recycled, lower boiling reaction components before entering the reactor again. The separated and devolatilized polymer melt is pumped through a heat exchanger to lower the stream temperature to a temperature in the range of less than 200° C., for example less than 170° C., or in the range of from 50 to 110° C.; thereby producing a cooled polymer melt. Subsequently, the cooled polymer melt is pumped through a die specially designed for underwater pelletization, cut into uniform solid pellets, dried, and transferred into a hopper. After validation of initial polymer properties, the solid polymer pellets are transferred to storage devices. The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can still have some hydrogen which is then fortified with fresh hydrogen.

The polymer pellets according to the present invention have less than 1,500 $ppm_w$ (parts per million per weight basis), for example less than 1,000 $ppm_w$, or in the alternative less than 500 $ppm_w$, of volatile impurities measured immediately after pelletization.

The polymer compositions according to the present invention have a viscosity of less than 100,000 cP; for example, in the range of from 1,000 to 30,000 cP when measured according to ASTM D1084.

In one embodiment, olefin based polymers, e.g. ethylene polymers or propylene polymers, may be prepared using a catalyst composition via a solution phase polymerization process in a loop reactor in accordance with the following procedure. All raw materials (ethylene, and optionally one or more alpha-olefin comonomer such as propylene or 1-octene) and the process solvent (an isoparaffinic solvent, for example ISOPAR E) are purified with molecular sieves before introduction into the reaction environment. Hydrogen is supplied as a high purity grade and is not further purified. The reactor monomer feed (ethylene) stream is pressurized via a mechanical compressor to a pressure that is above the reaction pressure, e.g. 750 psig. The solvent and comonomer (one or more alpha-olefin comonomer such as propylene or 1-octene) feed is pressurized via a mechanical positive displacement pump to a pressure that is above the reaction pressure, e.g. 750 psig. The individual catalyst components can be manually batch diluted to specified component concentrations with purified solvent (ISOPAR E) and pressurized to a pressure that is above the reaction pressure, e.g. 750 psig. All reaction feed flows can be measured with mass flow meters and independently controlled with computer automated valve control systems.

The continuous solution polymerization reactor may consist of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at, for example, two locations roughly with equal reactor volumes between each injection location. The fresh feed is controlled typically with each injector, for example, receiving half of the total fresh feed mass flow. The catalyst components are injected into the polymerization reactor through, for example, a specially designed injection inlet device and are combined into one mixed procatalyst/cocatalyst feed stream prior to injection into the reactor. The procatalyst component feed is computer controlled to maintain the reactor monomer concentration at a specified target. The cocatalyst component is fed based on calculated specified molar ratios to the procatalyst component. Immediately following each fresh injection location (either feed or catalyst), the feed streams are mixed with the circulating polymerization reactor contents with static mixing elements such as Kenics helical static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop can be provided by a screw pump. The effluent from the polymerization reactor (containing solvent, monomer, comonomer, hydrogen, catalyst components, and molten polymer) exits the reactor and enters a zone where it is contacted with a deactivating and optionally an acid scavenging agent (typically calcium stearate and the accompanying water of hydration) to stop the reaction and scavenge hydrogen chloride. In addition, various additives such as anti-oxidants can be added at this point. The stream then goes through another set of static mixing elements such as Kenics helical static mixing elements to evenly disperse the catalyst kill and additives. The effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a two stage separation and devolatilization system where the polymer is removed from the solvent, hydrogen, and unreacted monomer and comonomer. Impurities are removed from the recycled low boiling reaction components before entering the reactor again. The separated and devolatilized polymer melt is pumped through a heat exchanger to lower the stream temperature to a temperature in the range of less than 200° C., for example less than 170° C., or in the range of from 50 to 110° C.; thereby producing a cooled polymer melt. Subsequently, the cooled polymer melt is pumped through a die specially designed for underwater pelletization, cut into uniform solid pellets, dried, and transferred into a hopper. After validation of initial polymer properties, the solid polymer pellets are transferred to storage devices. The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can still have some hydrogen which is then fortified with fresh hydrogen.

The polymer pellets according to the present invention have less than 1,500 $ppm_w$, for example less than 1,000 $ppm_w$, or in the alternative less than 500 $ppm_w$, of volatile impurities measured immediately after pelletization.

The polymer pellets according to the present invention have a viscosity of less than 100,000 cP; for example, in the range of from 1,000 to 30,000 cP when measured according to ASTM D1084.

In one embodiment, olefin based polymers, e.g. ethylene polymers or propylene polymers, may be prepared using one or more catalyst systems suitable for polymerizing ethylene or propylene and optionally one or more α-olefin comonomers via a solution phase polymerization process in two adiabatic stirred-tank reactors, linked together in series in accordance to the following procedure. The ethylene monomer or propylene monomer, optionally one or more α-olefin comonomers, and hydrogen are combined with a solvent, e.g. an isoparaffinic solvent such as ISOPAR E. Impurities such as water, carbon dioxide, sulfurous compounds are removed from the feed streams, and the feed streams are cooled to temperature in the range of 5° C. to 60° C., for example, approximately 13° C., before entering the reactor. The majority, approximately from 85 to 90 percent, of the reaction may occur in the first stirred-tank reactor. The mixing may be achieved via circulating the polymer/procatalyst/cocatalyst/solvent/ethylene or propylene/optionally one or more α-olefin comonomers/hydrogen solution with one or more agitators equipped with mixing blades. The feed (ethylene or propylene/optional comonomer/solvent/hydrogen) may, for example, enter the reactor from the bottom and the procatalyst/cocatalyst may, for example, enter the reactor separately from the feed and also from the bottom. The first reactor temperature is in the range of from 120° C. to 190° C., for example, approximately 175° C., and the reactor pressure is in the range of from 400 psig to 1,000 psig, for example, approximately 500 psig. The temperature of the second reactor, in series with the first reactor, increases to a temperature in the range of from 175° C. to 210° C., for example, approximately 202° C. with approximately from 10 to 15 percent of the remaining reaction occurring and no additional catalyst or monomers are added. The average reactor residence time is in the range of from 2 to 30 minutes, for example, approximately 8 minutes per stirred-tank reactor prior to termination post-reactor by a fluid specially designed for that purpose.

The effluent from the polymerization reactor (containing solvent, monomer, comonomer, hydrogen, catalyst components, and molten polymer) exits the reactor and enters a zone where it is contacted with a deactivating and optionally an acid scavenging agent (typically calcium stearate and the accompanying water of hydration) to stop the reaction and scavenge hydrogen chloride. In addition, various additives such as anti-oxidants can be added at this point. The stream then goes through another set of static mixing elements such as Kenics helical static mixing elements to evenly disperse the catalyst kill and additives. The effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a two stage separation and devolatilization system where the polymer is removed from the solvent, hydrogen, and unreacted monomer and comonomer. Impurities are removed from the recycled lower boiling reaction components before entering the reactor again. The separated and devolatilized polymer melt is pumped through a heat exchanger to lower the stream temperature to a temperature in the range of less than 200° C., for example less than 170° C., or in the range of from 50 to 110° C.; thereby producing a cooled polymer melt. Subsequently, the cooled polymer melt is pumped through a die specially designed for underwater pelletization, cut into uniform solid pellets, dried, and transferred into a hopper. After validation of initial polymer properties, the solid polymer pellets are transferred to storage devices. The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can still have some hydrogen which is then fortified with fresh hydrogen.

The polymer pellets according to the present invention have less than 1,500 $ppm_w$, for example less than 1,000 $ppm_w$, or in the alternative less than 500 $ppm_w$, of volatile impurities measured immediately after pelletization.

The polymer pellets according to the present invention have a viscosity of less than 100,000 cP; for example, in the range of from 1,000 to 30,000 cP when measured according to ASTM D1084.

Examples

The following examples illustrate the present invention but are not intended to limit the scope of the invention. The examples of the instant invention demonstrate that inventive process increases the viscosity of low viscosity low molecular weight polymer leaving the devolatilization system by cooling it to a temperature of approximately 20° C. above the crystallization temperature, measured via DSC; thus, facilitating the pelletization of the low viscosity low molecular weight polymer.

Inventive Polymer Compositions 1-3

Inventive polymer (polyethylene) compositions 1-3 (IPC 1-3) were prepared according to the following process and based on the reaction conditions reported in Table 1. A well-mixed single-phase solution polymerization reactor was fed continuously with solvent ISOPAR E), octene-1, ethylene, and hydrogen in the proportions identified in Table 1. The polyethylene polymerization was conducted by introducing the components of a homogeneous catalyst, i.e. CAT-A, FAB, and MMAO-3A (further described in Table 2), at ratios suitable to sustain polymerization and in an amount to cause the conversion of the specified weight fraction of the ethylene fed to the reactor. The reaction temperature and pressure were controlled at the levels indicated below.

TABLE 1

|  |  | IPC-1 | IPC-2 | IPC-3 |
|---|---|---|---|---|
| Into the reactor | Solvent (lbs/hr) | 630 | 630 | 613 |
| Into the reactor | Ethylene (lbs/hr) | 110 | 110 | 137 |
| Into the reactor | Octene (lb/hr) | 124 | 80 | 142 |
| Into the reactor | Hydrogen (sccm) | 3,360 | 3,650 | 1,505 |
| In the reactor | Pressure (psig) | 495 | 495 | 535 |
| In the reactor | Temperature (° C.) | 120 | 120 | 135 |
| Out of the reactor | Ethylene Conv. (wt %) | 89.5 | 91 | 90.7 |

TABLE 2

| Description | Chemical Name |
|---|---|
| CAT-A | Titanium, [N-(1,1-dimethylethyl)-1,1-dimethyl-1-[(1,2,3,4,5-η)-2,3,4,5-tetramethyl-2,4-cyclopentadien-1-yl]silanaminato(2-)-.N][(1,2,3,4-η)-1,3-pentadiene]- |
| FAB | tris(2,3,4,5,6-pentafluorophenyl)-borane |
| MMAO-3A | Aluminoxanes, iso-Bu Me, branched, cyclic and linear; modified methyl aluminoxane |

Each reaction resulted in the production of a polymer solution containing a low-molecular-weight copolymer in the amount and of the characteristics as described in the Table 3.

TABLE 3

|  | IPC-1 | IPC-2 | IPC-3 |
|---|---|---|---|
| Polymer production Rate (lbs/hr) | 166 | 143 | 196 |
| Polymer Density (g/cc) | 0.872 | 0.890 | 0.871 |
| Melt Viscosity (cP) | 4,850 | 4,930 | 17,300 |
| % crystallinity (DSC) | 16.6 | 28.4 | 17.3 |
| Tc onset (° C., DSC) | 54.3 | 74.2 | 55.1 |

In each inventive process, the solvent was separated from the polymer in a two-stage flash operation, the second stage being conducted under a temperature and pressure such that 0.1 wt % or less residual volatiles remained with the polymer. The temperature of the polymer and the predicted volatile levels for each example are show below in Table 4.

TABLE 4

|  | IPC-1 | IPC-2 | IPC-3 |
|---|---|---|---|
| Vacuum (mmHg) | 15 | 15 | 16 |
| Polymer Temp (° C.) | 200 | 200 | 195 |
| Volatiles (wt %) | 0.06 | 0.06 | 0.1 |
| Polymer Viscosity at exit of $2^{nd}$ stage devolatilizer (cP) | 3,500 | 3,900 | 12,000 |

Each polymer melt is processed with a conventional underwater pelletizer according to the following process. The pelletizer system consists of an underwater pelletizer (K-514), a pellet spin dryer (S-514, D-514), a pump (P-514), and a set of heat exchangers (E-514A/B). The molten polymer exiting the second stage flash is pumped through a series of die holes and into the underwater pelletizer. As the polymer emerges from the die holes, it is cut into pellets by the rotating blades and the cold water solidifies the copolymer as it passes through the cutting chamber. Water transports the pellets to the pellet spin dryer. The dried pellets are discharged from the top of the pellet dryer while the water removed is cooled and returned back to the pelletizer. K-514 is a Gala Model SMUP-6D underwater pelletizer (Gala Industries, Inc., Eagle Rock, Va.). K-514 has a removable center design die plate with eighteen 0.125"-diameter die holes. An electrical heater is used to heat the die plate.

In order to condition the melt to a high enough melt viscosity to ensure all the die holes are filled and that there is sufficient viscosity and pressure drop to allow the pelletizer system to function with the low molecular weight polymers of the examples, a melt-cooling heat exchanger is placed between the second stage flash and K-514. The exchanger employed in the examples has the following characteristics:

a. The melt cooler system consists of two heat exchangers (E-516 and E-526), a pump (P-516), and an inline mixer (M-516). Syltherm 800 is used on the shell side of E-516 to both cool the polymer close to its crystallization temperature ($T_a$) and increase the melt viscosity to facilitate pelletization.

b. E-516 is a Kenics Model 21-29 Type E High Efficiency Heat Exchanger (Chemineer, Houston, Tex.). It has an overall length of 13" and 135 1¼"-OD tubes on the inside.

The process variables as well as the exit polymer viscosity for the three examples are shown in the next Table 5.

TABLE 5

|  | IPC-1 | IPC-2 | IPC-3 |
|---|---|---|---|
| Polymer Flow (lbs/hr) through the melt cooler system | 166 | 143 | 196 |
| Outlet Temp (° C.) (melt cooler) | 111 | 117 | 96 |
| Pressure drop (psi) | 52 | 51 | 205 |
| Syltherm Temp (° C.) | 85 | 84 | 82 |
| Syltherm Flow (lbs/hr) | 17,000 | 17,000 | 12,600 |

TABLE 5-continued

|  | IPC-1 | IPC-2 | IPC-3 |
|---|---|---|---|
| Exit polymer Viscosity (cP) | 18,300 | 18,000 | 100,000 |

Comparative Polymer Compositions 1-4

Comparative polymer (polypropylene) compositions 1-4 (CPC 1-4) were prepared according to the following process and based on the reaction conditions reported in Table 6.

The samples were made using a well mixed, single (liquid) phase, isothermal polymerization (loop) reactor.

Propylene, ethylene, and hydrogen were dissolved in solvent (i.e. Isopar E) and continuously fed to the reactor at the proportions identified in the Table 6. The catalyst system comprising a molecular catalyst for each inventive process is further described in Table 7. For all 4 runs the primary catalyst activator was RIBS-2 and the secondary catalyst activator and scavenger of polar impurities was MMAO-3A, as further described in Table 7. The catalyst complex was fed at a rate such that the propylene conversion was maintained at the value specified in the Table 6. The primary and secondary catalyst activators were fed at ratios optimized to properly activate the catalyst complex and sustain polymerization. The reaction temperature and pressure were controlled at the levels defined in the Table 6.

TABLE 6

| Parameter | Units | CPC-1 | CPC-2 | CPC-3 | CPC-4 |
|---|---|---|---|---|---|
| Solvent Feed | lbs/hr | 578 | 594 | 588 | 574 |
| Fresh Ethylene Feed | lbs/hr | 15.2 | 33.4 | 39.3 | 15.9 |
| Fresh Propylene Feed | lbs/hr | 241 | 218 | 221 | 246 |
| Fresh Hydrogen Feed | sccm | 4,849 | 5,748 | 6,552 | 7,049 |
| Reactor Pressure | psig | 545 | 544 | 545 | 545 |
| Reactor Temperature | ° C. | 150 | 150 | 110 | 110 |
| Propylene Conversion | wt % | 90.6 | 91.0 | 91.8 | 81.0 |
| Catalyst Type | — | CAT-B | CAT-B | Cat-C | Cat-C |

TABLE 7

| Description | Chemical Name |
|---|---|
| CAT-B | Hafnium, [[2',2'''-[1,2-cyclohexanediylbis(methyleneoxy-κO)]bis[3-(9H-carbazol-9-yl)-5-methyl[1,1'-biphenyl]-2-olato-κO]](2-)]dimethyl- |
| CAT-C | Hafnium, [N-[2,6-bis(1-methylethyl)phenyl]-α-[2-(1-methylethyl)phenyl]-6-(1-naphthalenyl-κC2)-2-pyridinemethanaminato(2-)-κN1,κN2]dimethyl- |
| RIBS-2 | bis(hydrogenated tallow alkyl)methyl, tetrakis(pentafluorophenyl)borate(1-) amine |
| MMAO-3A | Aluminoxanes, iso-Bu Me, branched, cyclic and linear; modified methyl aluminoxane |

For each run, the hydrogen level was controlled at the value specified in the Table 6 to ensure the "Polymer Melt Viscosity" for the resin was equal to that specified in the Table 8. For each run, the ethylene level was controlled at the value specified in the Table 6 to ensure the "Pellet Density" was controlled at the value specified in the Table 8.

TABLE 8

| Parameter | Units | CPC-1 | CPC-2 | CPC-3 | CPC-4 |
|---|---|---|---|---|---|
| Production Rate | lbs/hr | 252 | 252 | 257 | 249 |
| Pellet Density | g/cc | 0.8853 | 0.8648 | 0.8645 | 0.8853 |
| Polymer Melt Viscosity | cP | 3,595 | 8,188 | 7,980 | 3,734 |
| Crystallinity | % | 29.5 | 10.5 | 11.7 | 32.4 |
| Crystallization onset ($T_c$) | ° C. | 67.3 | 29.9 | 58.1 | 72.6 |

Solvent as well as unreacted propylene, ethylene, and hydrogen were separated from the polymer in a two stage devolatilization. The pelletization process did not include the melt cooler heat exchanger; therefore, the "$2^{nd}$ Stage Devolatilizer Polymer Pool Temperature" was minimized in an effort to pelletize each polymer without the melt cooler heat exchanger. The polymer temperature could not be controlled at a low enough level and as a result the samples could not be pelletized. Instead the molten polymer samples were pumped from the second stage devolatilizer into silicone lined boxes and collected as bales. Each solidified polymer sample weighed approximately 30 lbs.

TABLE 9

| Parameter | Units | CPC-1 | CPC-2 | CPC-3 | CPC-4 |
|---|---|---|---|---|---|
| $2^{nd}$ Stage Devolatilizer Pressure | mmHg absolute | 4.9 | 5.0 | 5.9 | 5.9 |
| $2^{nd}$ Stage Devolatilizer Polymer Pool Temperature | ° C. | 156 | 152 | 148 | 154 |
| Melt Viscosity at Exit of $2^{nd}$ Stage Devolatilizer | cP | 7,000 | 18,000 | 18,000 | 7,000 |

Test Methods

Test methods include the following:

Density (g/cm$^3$) was measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Weight average molecular weight ($M_w$) and number average molecular weight ($M_n$) were determined according to methods known in the art using conventional GPC, as described herein below.

The molecular weight distributions of ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 μm columns and one Shodex HT803M 150 mm, 12 μm column. The solvent used was 1,2,4 trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.*, 6, 621 (1968)):

$$M\text{polyethylene} = A \times (M\text{polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing $2^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

$$\text{a) } \overline{Mn} = \frac{\sum_i Wf_i}{\sum_i \left(\frac{Wf_i}{M_i}\right)}$$

$$\text{b) } \overline{Mw} = \frac{\sum_i (Wf_i * M_i)}{\sum_i Wf_i}$$

$$\text{c) } \overline{Mz} = \frac{\sum_i (Wf_i * M_i^2)}{\sum_i (Wf_i * M_i)}$$

(2)

Viscosity was measured via ASTM D1084.

Percent Volatiles was measured via ASTM D3030.

The present invention may be embodied in other forms without departing from the spirit and the essential attributes thereof, and, accordingly, reference should be made to the appended claims, rather than to the foregoing specification, as indicating the scope of the invention.

We claim:

1. A process for producing a pelletized polymer composition comprising:
   polymerizing one or more alpha-olefins in one or more solution reactors thereby producing a molten polymer composition comprising one or more solvents;
   removing at least a portion of said one or more solvents in a devolatilization system thereby forming a polymer composition having a low solvent content of less than 1,000 parts of solvent per million of polymer on a weight basis;
   removing heat from said polymer composition having low solvent content in a heat exchanger to a temperature in the range of equal to or greater than the crystallization point of the polymer composition having low solvent content to less than or equal to a temperature in the range of from the crystallization point of the polymer composition having low solvent content+20° C., to less than 200° C., thereby forming a viscous polymer melt; and
   pelletizing said viscous polymer melt via an underwater pelletizer thereby forming said pelletized polymer composition.

2. The process for producing a pelletized polymer composition of claim 1, wherein said alpha-olefin is ethylene, propylene, or combinations thereof.

3. The process of claim 1, wherein each pelletized polymer composition has diameter in the range of from less than 6 mm.

4. The process of claim 1, wherein said pelletized polymer has a viscosity of less than 100,000 cP at 177° C. as measured according to ASTM D1084.

5. The process of claim 1, wherein the step of removing heat from said polymer composition having low solvent content includes removing heat from the polymer composition having low solvent content to a temperature in the range of from 50 to less than 200° C.

6. The process of claim 1, wherein after the step of polymerizing one or more alpha-olefins in one or more solution reactors, the molten polymer composition exits the reactor and enters a zone where it is contacted with a deactivating agent.

7. The process of any of claim 1, wherein the pelletized polymer composition has less than 500 $ppm_w$ of volatile impurities measured immediately after pelletization.

* * * * *